Patented May 10, 1932

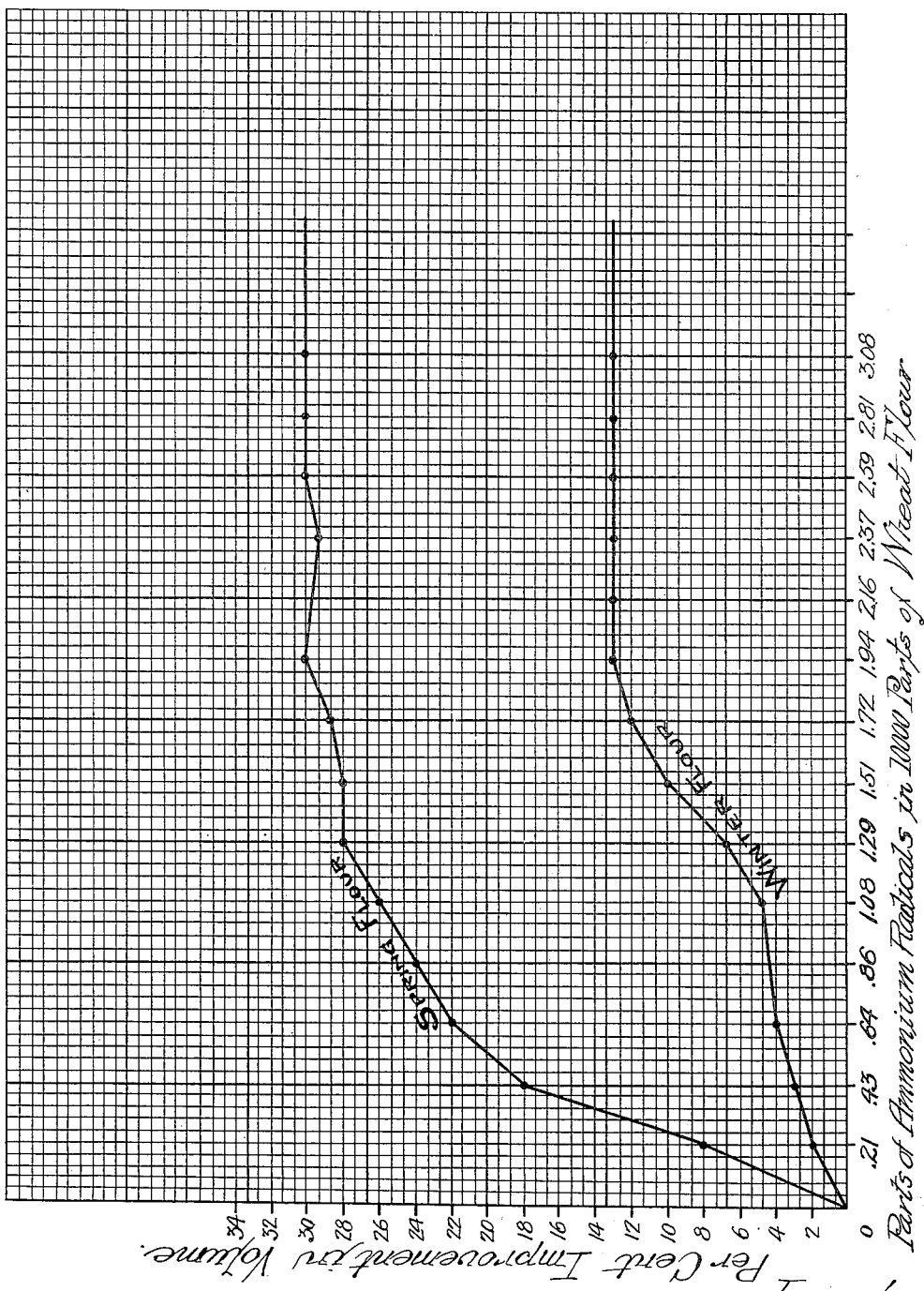

1,858,093

UNITED STATES PATENT OFFICE

JOHN P. IOANNU, OF PHILADELPHIA, PENNSYLVANIA, ASSIGNOR TO PENNSYLVANIA SALT MANUFACTURING COMPANY, OF PHILADELPHIA, PENNSYLVANIA, A CORPORATION OF PENNSYLVANIA

PROCESS AND COMPOSITION FOR IMPROVING CEREAL PRODUCTS

Application filed April 16, 1930. Serial No. 444,790.

My invention relates to a novel process and composition for treating flour and more particularly it relates to a process and composition for improving the strength, baking qualities and color of the wheat flours and other cereal products.

One object of my invention is to provide a process and composition for treating flour in which the strength, baking qualities and color are improved in a marked manner with no possibility of overtreatment effects.

A further object is to furnish a process and composition for improving the qualities of flour during the milling operations by the use of which only negligible quantities of entirely harmless foreign materials are added to the flour, the ash content of the flour after treatment showing no increase when tested according to the usual standard methods of testing.

Still another object is to provide a process and a composition of matter which acts both physically and chemically to improve the flour, by controlling and favorably affecting the formation of gluten in the dough and the state of aggregation of the different proteids and at the same time exerting a mild bleaching action on the flour without producing overtreatment effects.

Other objects will be apparent from a consideration of the specification and claims.

Heretofore, the processes and compositions suggested for use in bettering the strength of flour produce a very small improvement, if any, on the flour and include the use of chemicals in rather high concentrations, generally above 1% of the weight of the flour. Thus foreign substances are introduced into the flour in substantial amounts and since the flour is graded by its ash content, this ash increase lowers the grade of flour. Furthermore, the substances used in bleaching the flours because of high chemical activity are not subject to control and quite frequently produce over-treatment effects particularly when the treated flour is stored for a period of time.

The composition and process of the present invention is characterized by both physical and chemical action which improves the baking qualities of the flour and at the same time the color of the wheat flours and other cereal products treated. The composition and process of the present invention control effectively and consistently the degree of aggregation of the various proteids in the flour during the mutual irreversible precipitation of them, thus governing the plasticity, elasticity, imbibition and swelling properties of the gluten formed. A progressive mild bleaching action also takes place which affects in a favorable manner the color of the products treated without producing overtreatment even when the resulting product is stored before use. The composition of the present invention is used in such small proportions that the foreign materials introduced in the flour, although entirely harmless, are of such small amounts that they are negligible; the analysis of the treated flour by the usual standard methods of testing gives an ash content no higher than that of the untreated flour. Hence, the treated flour is placed in the same grade as the untreated flour.

Hereinafter in the specification and claims where the statement is made that the amount of composition added to the cereal product is less than that percentage which will appreciably increase the ash content of said product, it is to be understood that the amount added is such that the grade of the cereal product treated with the composition, remains the same as that of the untreated product, when judged according to the usual commercial standards of flour grades based on their ash content.

My invention contemplates the use of a composition which relies for its effectiveness on the specific action of ammonium radicals on the materials in the flour. The composition contains at least two ammoniacal compounds, at least one of which is an oxidizing compound and at least one of which is a non-oxidizing compound.

The composition is so adjusted that during the treatment of the flour, the specific action of ammonium radicals is maintained and is effective in bringing about the control of the aggregation of the various proteids and the progressive bleaching action on the materials in the flour. The concentration of ammonium radicals is so chosen that the composition acts favorably on the formation of gluten in the dough and the state of aggregation of the different proteids as well as regards the bleaching action without increasing the ash content of the flour treated in any detectable or appreciable degree.

As a result of extensive work, I have found that an increase in the amounts of ammonium radicals present in the flour causes an increase in the improvement obtained up to a certain point and that when the amount added reaches this point, no further improvement is encountered. In the attached curves, the amount of ammonium radicals in 10,000 parts of wheat flour is plotted against the per cent. improvement in volume. There are two curves on the plot, one showing the improvement with spring flour and the other showing the improvement obtained with winter flour. It will be seen that additions between .1 and 2.5 parts of ammonium radicals per 10,000 parts of flour improve the qualities of the flour but that the use of amounts greater than 2.5 parts does not increase the improvement. Although these curves show the improvement with the two types of wheat flour mentioned and the amount of improvement found in any particular flour or cereal product varies with its origin and chemical composition, it has been found that the improvement obtained by the use of the composition of the present invention falls within the two extreme curves shown in the drawing.

Since the ammonium radicals must be added in the form of salts, the ammonium compounds added are those in which the specific action of the ammonium radicals in the flour or cereal product is possible, and which are entirely harmless from the standpoint of human consumption. The compounds used are ammoniacal salts and may be inorganic or organic. For example, the ammonium salts of the halides, the sulphur-oxygen groups and the phosphorous-oxygen groups are applicable. The last two named groups may be of any valence, that is at any of the different possible stages of oxidation. Of the organic groups, the tartrates, lactates, succinates, citrates, and the like may be mentioned. These mentioned groups either organic or inorganic are not to be considered limiting for other similar groups joined to the ammonium radical may be employed provided the compound used is harmless and sufficiently maintains the specific action of the ammonium radicals in use. A mixture of various combinations of ammonium salts gives excellent results. If desired, the active ammonium salts may be modified somewhat by the addition of inert materials for dilution purposes and to aid in the dispersion of the composition in the flour. The sodium and calcium salts of phosphoric acid may be used as dilutents in any convenient proportion to obtain a product of a decreased activity to satisfy the needs of the different types of flour.

The drawing is based on parts of ammonium groups per 10,000 parts of flour but since the composition contains also the acid groups as well as possible diluents, the actual weight of composition to flour used is correspondingly increased. The percentages used vary considerably depending on the flour or other cereal product and on the results desired, but for most purposes the ratio of composition to flour is 1.5 to 3 grams of composition to 10,000 grams of flour. This amount improves the flour in a visible and very substantial degree. Instead of using the crystallized salts, if it is desired, the mother liquors resulting from the manufacture of ammonium salts may be used, for example, the mother liquors from the manufacture of ammonium persulphate. The composition may be added to the flour at any suitable stage, care being taken that the composition is thoroughly and uniformly distributed in the flour. I prefer to add the composition to the flour immediately after milling for then the subsequent sifting and the like insures homogeneity in the product.

As typical formulæ for the composition of the present invention, the following are given:—

Formula A

| | Parts |
|---|---|
| Ammonium chloride | 20 |
| Ammonium sulphate | 30 |
| Ammonium persulphate | 30 |
| Ammonium phosphate | 20 |

Formula B

| | Parts |
|---|---|
| Ammonium acid phosphate | 20 |
| Ammonium mono-persulphate | 2–5 |
| Ammonium di-persulphate | 58 |
| Sodium phosphate | 3 |
| Calcium phosphate | 16 |

Formula C

| | Parts |
|---|---|
| Ammonium sulphate | 20 |
| Ammonium mono-persulphate | 10 |
| Ammonium persulphate | 50 |
| Ammonium acid phosphate | 15 |
| Calcium acid phosphate | 5 |

Formula D

| | Parts |
|---|---|
| Ammonium chloride | 10 |
| Ammonium sulphate | 30 |
| Ammonium perborate | 30 |
| Ammonium phosphate | 20 |
| Ammonium tartrate | 5 |
| Ammonium citrate | 5 |

*Formula E*

| | Parts |
|---|---|
| Ammonium sulphate | 18 |
| Ammonium di-persulphate | 58 |
| Ammonium mono-persulphate | 2–6 |
| Sodium phosphate | 4 |
| Calcium phosphate | 18 |

It will be noted that in the formulæ, the use of an oxidizing ammonium salt together with a non-oxidizing ammonium salt is given. This combination has been found to be particularly desirable for use with those cereal products which are difficult to bleach. When a stronger bleaching action is desired than is obtained with the use of the above formulæ, strong oxidizing agents of organic or inorganic nature may be used in conjunction with the formulæ. The exact amount added depends on the bleaching action desired and may be as high as 15% or 20% of the weight of other materials. The inorganic or organic peroxides, such as benzoyl peroxide, the peroxides of the fatty acids and the like give excellent results. The perborates, perphosphates, and the anhydrides of organic acids may also be used as they and like compounds are suitable for the purpose. If 15% of benzoyl peroxide is added to the materials of Formula E, a composition having excellent properties, both from the standpoint of improving the properties of the flour and of bleaching it, is obtained.

From these formulæ, it will be seen that various mixtures of ammonium compounds in various proportions are applicable with or without the use of such compounds as the sodium or calcium phosphates without departing from the essential features of my invention. Furthermore, considerable variation is possible in the amount of composition added to the flour or other cereal product to produce the desired results, all of which is within the scope of the invention.

I claim:

1. A composition for improving the qualities of and for bleaching cereal products which comprises a mixture of at least two ammoniacal compounds, at least one of the ammoniacal compounds being an oxidizing salt and at least one being a non-oxidizing compound, said composition to be used in admixture with said cereal products in amounts less than that percentage which will appreciably increase the ash content of said cereal product.

2. A composition for improving the qualities of and for bleaching cereal products which comprises a mixture of at least two ammoniacal compounds, at least one of the ammoniacal compounds being an oxidizing salt and at least one being a non-oxidizing compound, and a dilutent, said composition to be used in admixture with said cereal products in amounts less than that percentage which will appreciably increase the ash content of said cereal product.

3. A composition for improving the qualities of and for bleaching cereal products which comprises a mixture of the ammonium salts of sulphuric acid and of a persulphuric acid, said composition to be used in admixture with said cereal products in amounts less than that percentage which will appreciably increase the ash content of said cereal product.

4. A composition for improving the qualities of and for bleaching cereal products which comprises a mixture of the ammonium salts of sulphuric acid and of a persulphuric acid and a dilutent, said composition to be used in admixture with said cereal products in amounts less than that percentage which will appreciably increase the ash content of said cereal product.

5. A composition for improving the qualities of and for bleaching cereal products which comprises a mixture of ammonium sulphate, ammonium di-persulphate, ammonium mono-persulphate and a phosphate other than ammonium phosphate, said composition to be used in admixture with said cereal products in amounts less than that percentage which will appreciably increase the ash content of said cereal product.

6. A composition for improving the qualities of and for bleaching cereal products which comprises ammonium sulphate 18 parts, ammonium di-persulphate 58 parts, ammonium mono-persulphate 2 to 6 parts, sodium phosphate 4 parts, and calcium phosphate 18 parts, said composition to be used in admixture with said cereal products in amounts less than that percentage which will appreciably increase the ash content of said cereal product.

7. The process of improving the qualities of and bleaching cereal products which comprises treating the cereal products in a powdered condition with a composition including a mixture of at least two ammoniacal compounds, at least one of which is an oxidizing salt and at least one of which is a non-oxidizing compound, the amount of composition added being below that percentage which will appreciably increase the ash content of the cereal product.

8. The process of improving the qualities of and bleaching cereal products which comprises treating the cereal products in a powdered condition with a composition including a mixture of at least two ammoniacal compounds, at least one of which is an oxidizing salt and at least one of which is a non-oxidizing compound, the total amount of ammonium radical being between .1 part and 2.5 parts per 10,000 parts of cereal products and the amount of composition added being below that percentage which will appreciably increase the ash content of the cereal product.

9. A cereal product containing a composition including a least two ammoniacal compounds, at least one of which is an oxidizing salt and at least one of which is a non-oxidizing salt, the amount of composition added being below that percentage which will appreciably increase the ash content of the cereal product.

10. A cereal product containing a composition including at least two ammoniacal compounds, at least one of which is an oxidizing salt and at least one of which is a non-oxidizing salt, the composition being present such that the total amount of ammonium radical is between .1 part and 2.5 parts per 10,000 parts of cereal product, and the amount of composition added being below that percentage which will appreciably increase the ash content of the cereal product.

11. A composition for improving the qualities of and for bleaching cereal products which comprises a mixture of ammonium sulphate, ammonium di-persulphate, ammonium mono-persulphate, a phosphate other than ammonium phosphate and a peroxide capable of exerting an oxidizing action, said composition to be used in admixture with said cereal products in amounts less than that percentage which will appreciably increase the ash content of said cereal product.

12. A composition for improving the qualities of and for bleaching cereal products which comprises ammonium sulphate 18 parts, ammonium di-persulphate 58 parts, ammonium mono-persulphate 2 to 6 parts, sodium phosphate 4 parts, calcium phosphate 18 parts, and benzoyl peroxide in amounts equal to approximately 15% of the weight of the other materials, said composition to be used in admixture with said cereal products in amounts less than that percentage which will appreciably increase the ash content of said cereal product.

13. The process of improving the qualities of and bleaching cereal products which comprises treating the cereal products in a powdered condition with a composition including a mixture of at least two ammoniacal compounds, at least one of which is a sulphate and at least one of which is a persulphate, the amount of composition added being below that percentage which will appreciably increase the ash content of the cereal product.

14. The process of improving the qualities of and bleaching cereal products which comprises treating the cereal products in a powdered condition with a composition including a mixture of ammonium sulphate, ammonium di-persulphate, ammonium mono-persulphate, and a phosphate other than ammonium phosphate, the amount of composition added being below that percentage which will appreciably increase the ash content of the cereal product.

15. A cereal product containing a composition including at least two ammoniacal compounds, at least one of which is a sulphate and at least one of which is a persulphate, the amount of composition added being below that percentage which will appreciably increase the ash content of the cereal product.

16. A cereal product containing a composition including ammonium sulphate, ammonium di-persulphate, ammonium mono-persulphate, and a phosphate other than ammonium phosphate, the amount of composition added being below that percentage which will appreciably increase the ash content of the cereal product.

JOHN P. IOANNU.